United States Patent [19]

Martinovich et al.

[11] Patent Number: 5,488,356
[45] Date of Patent: Jan. 30, 1996

[54] METHOD AND APPARATUS FOR SECURE PROGRAMMING OF COMMUNICATION RADIOS

[76] Inventors: Krsman Martinovich, 52 N. Walnut Ct., Streamwood, Ill. 60107; Donald R. Beyer, 310 Terrace Dr., Bartlett, Ill. 60103

[21] Appl. No.: 220,128

[22] Filed: Mar. 30, 1994

[51] Int. Cl.⁶ .................................................... H04Q 1/00
[52] U.S. Cl. ................................ 340/825.22; 340/825.44; 455/38.1
[58] Field of Search .................... 340/825.22, 825.44; 455/38.1

[56] References Cited

U.S. PATENT DOCUMENTS 4,975,693  12/1990  Davis ................................. 340/825.44
5,345,227   9/1994  Fascenda .......................... 340/825.22

Primary Examiner—Brian Zimmerman
Attorney, Agent, or Firm—James A. Coffing

[57] ABSTRACT

A method of providing operational features for a programmable radio (202) employs a security key (210). The security key (210) is preferably coupled to an interface device (208) and includes at least an indication of a desired feature set. Using this indication, or flashcode (220), the programming system is able to securely program (609) the radio (202) with the desired feature set (504).

12 Claims, 3 Drawing Sheets

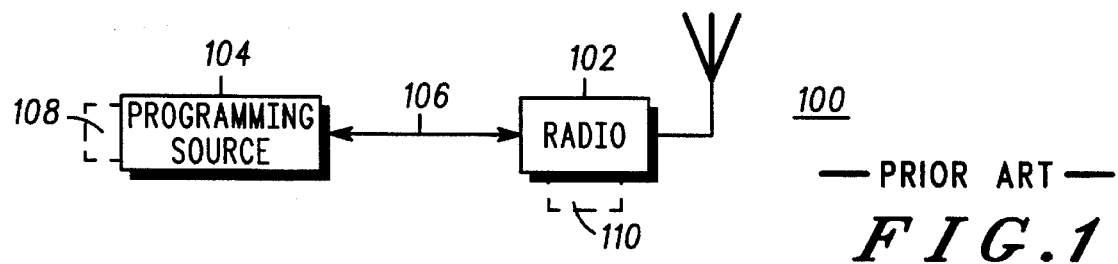
— PRIOR ART —
FIG.1
FIG.2
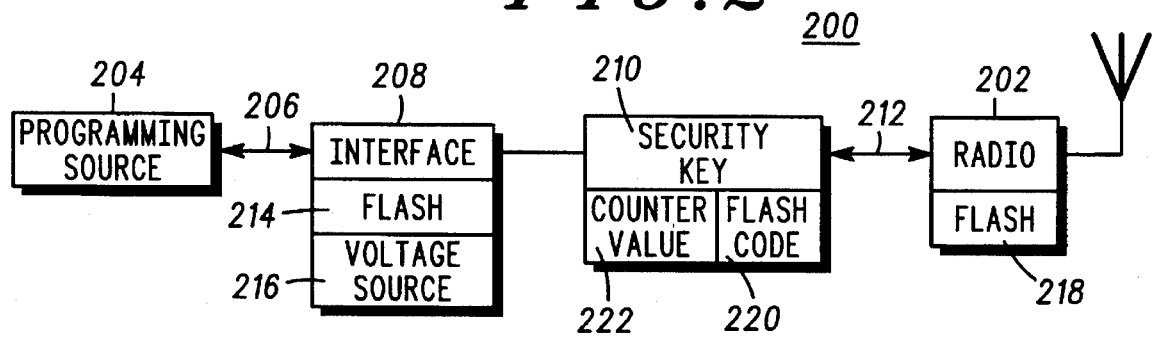
FIG.3
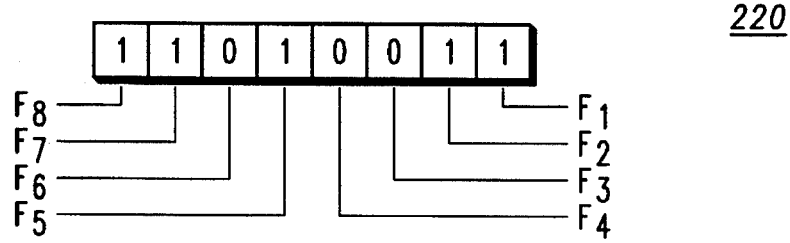
FIG.4

METHOD AND APPARATUS FOR SECURE PROGRAMMING OF COMMUNICATION RADIOS

FIELD OF THE INVENTION

The present invention relates generally to programmable communication radios, and in particular to a programming system used in conjunction therewith.

BACKGROUND OF THE INVENTION

Radio communication systems are well known in the art. Further, programmable radios are often used in such communication systems to provide flexible adaptation of communication features. Unlike radios of the past that relied on hardware components to establish radio functionality, today's features are provided through the use of software and firmware residing in the radio. This allows for flexible feature programming without the need to disassemble the radio unit and add (or replace) hardware components each time an upgrade is desired.

FIG. 1 shows an exemplary radio programming system 100 that includes a programmable radio 102, a programming source 104, and a programming link 106. Generally, communication features are installed in the radio 102 by sending commands from the programming source 104, which commands include appropriate data for the features being programmed. This programming process is typically performed only by authorized service personnel, and therefore requires that the radio 102 be temporarily put out of service. Aside from the inconvenience of this, prior art programming techniques can be cost prohibitive. Perhaps even more importantly, today's programming methods include security provisions that can be readily compromised. That is, by illicit programming of legitimately owned radios, an unscrupulous party can upgrade a radio without paying the fees normally associated with that upgrade. Lastly, certain feature programming implementations are impractical in view of the size limitations put on the radio units. As an example, so called smartcards—i.e., credit card sized memory devices—can be used to directly provide operating features for the radio.

There are several problems with the programming techniques of the prior art, such as those generally depicted in FIG. 1. For example, a so-called hard key 108 provides security through the use of a hard-coded security code that is read by the programming source 104. However, the hard key 108 can be easily replaced with a hard key having a known security code. The software in programming source 104—typically a personal computer or the like—can then be modified to look for the known security code in the replaced hard key, rather than the original security code from the legitimate key. In this manner, an unscrupulous owner is able to program the radio 102 by simply modifying a few lines of programming code. This becomes an increasingly problematic security concern, as many radio owners are well versed in the programming languages used to modify radio features.

Use of a 110 is impractical for reasons having to do more with size limitations than with security (though security can also be a problem). In particular, today's card readers consume an inordinate amount of current when reading the smartcard 110. Accordingly, in applications where the portable radio 102 is size-limited, an oversized battery—to source the required current to the card reading hardware— would compromise the objective of making the radio smaller.

Accordingly, there exists a need for a radio programming system that is not constrained by the shortcomings of the prior art. In particular, such a system that did not rely on easily compromised hard keys for security, or current consuming smartcard readers, would be an improvement over the prior art.

BRIEF DESCRIPTION OF THE DRAWINGS

FIG. 1 shows a block diagram of a radio programming system, known in the prior art;

FIG. 2 shows a block diagram of a radio programming system, in accordance with the present invention;

FIG. 3 shows a feature set indication, in accordance with the present invention;

FIG. 4 shows a group of feature set indications, in accordance with the present invention;

DETAILED DESCRIPTION OF THE PREFERRED EMBODIMENT

Figure 5:
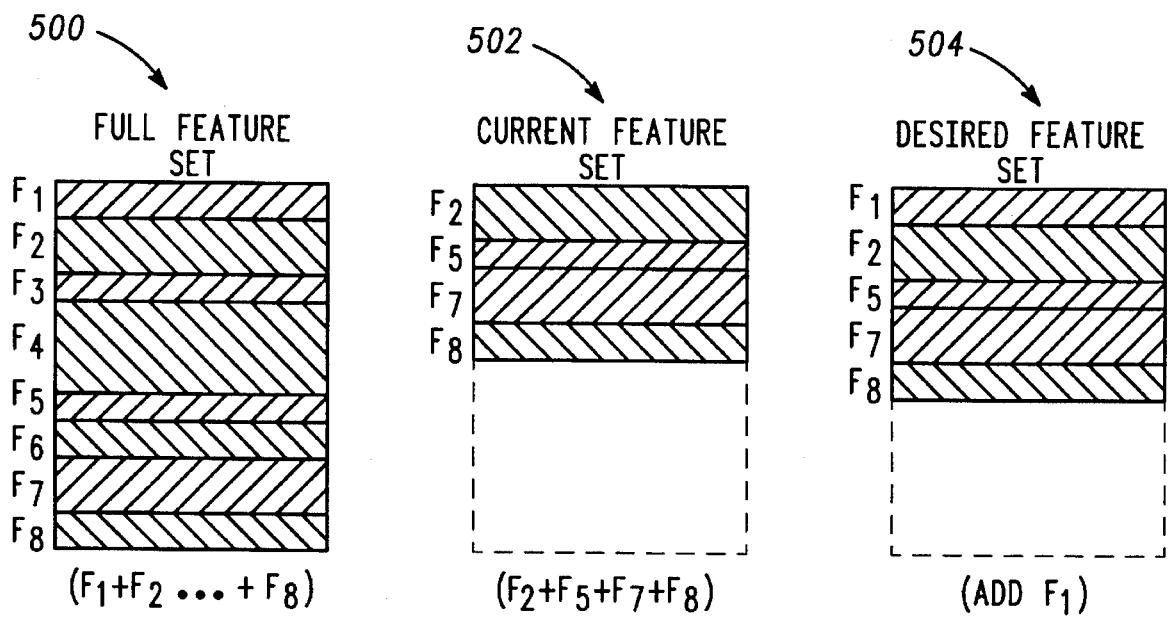
FIG. 5 shows a group of feature sets, some of which correspond to the feature set indications shown in FIG. 4.

Generally, the present invention encompasses a method of providing operational features for a programmable radio through the use of a security key. In particular, the security key includes an indication of a desired feature set, which desired feature set is then programmed into the radio. In this manner, the present invention can be advantageously employed to allow customers to program their own radio with upgrade features, without having to have the radio serviced.

The present invention can be better understood with reference to FIGS. 2–7. FIG. 2 shows a programming system 200 that includes a programmable radio 202, a programming source 204, an interface link 206, an interface device 208, and a security key 210. In a preferred embodiment, the interface device 208 includes flash memory 214 and a voltage source 216. The security key 210 includes, inter alia; a flash code (i.e., desired feature set indication) 220 and a counter value 222, the use of which are hereinafter described.

In a preferred embodiment, the flash memory 214 is used to store the operating software for the interface device, as well as the upgrade software for the radio. This allows for one-time updates of the upgrade software—i.e., desired feature set—which is particularly useful when the data communication rate between the programming source 204 and the interface device 208—i.e., link 206—is limited to low baud rates. That is, once the radio upgrade software is stored in the flash memory 214, transfer of software from the interface device 208 to the radio 202 can be performed at a much higher baud rate. This also enables the programming source 204 to automatically verify that the interface device 208 contains the latest operating software and, if necessary, updating the interface device 208. Further, subsequent upgrades are made considerably more quickly, as the transfer of upgrade software between the programming source 204 and the interface device 208 is no longer required. In The voltage source 216 is used to enable flash programming in the radio. It should be noted that, although a voltage source is described in this implementation, any energy source (e.g., a current source) or signaling sequence (e.g., enabling protocol) could also be used.

FIG. 3 shows an exemplary flash code 220, in accordance with a preferred embodiment of the invention. As an 8-bit word, the flash code 220 serves as an indication of a desired feature set that includes eight distinct features. That is, the flash code 220 serves as an indication of those features that are to be enabled (binary '1') and those which are not to be enabled (binary '0'). Of course, a larger, or smaller word can be used to provide an indication for a feature set of a different size. In any case, the flash code 220 is programmed into the security key 210, as later described, by the service provider.

FIG. 4 shows a group of three feature set indications that can be employed by the present invention in the manner hereafter described. In order to program the radio with a desired feature set, an indication of that desired feature set—e.g., flash code 220—must first be determined. The desired feature set is determined by "combining" a current feature set indication 400 with a new feature set indication 402. That is, the service provider loads the current feature set indication 400 for a particular radio, and logically adds to that binary string the code 402 for the feature to be added—e.g., feature $F_1$. In this manner, the service provider acts as the clearing house for all changes made to the customer's radio. That is, if the radio user illicitly obtains a larger feature set, the next upgrade will result in the radio being programmed with only those features legitimately obtained.

FIG. 5 shows a group of feature sets—i.e., memory locations containing software required to enable particular radio features. Feature set 500 represents the full feature set—i.e., the software required to enable all available features ($F_1$–$F_8$) in the radio. As an example of how the feature sets are used in the upgrade process, reference is made to the feature sets 502, 504, which are each subsets of the full feature set 500. It is assumed that the radio to be upgraded has enabled those features identified by feature set indication 400 shown in FIG. 4. That is, features $F_2$, $F_5$, $F_7$, $F_8$ are currently programmed into a radio, and the owner of the radio wishes to add feature $F_1$. To perform the upgrade, the programming source compares the desired feature set indication with the current feature set indication to determine which software features are to be added to the current feature set. The programming source then compiles the required software to arrive at the desired feature set 504, and programs this into the radio, as later described.

Figure 6:
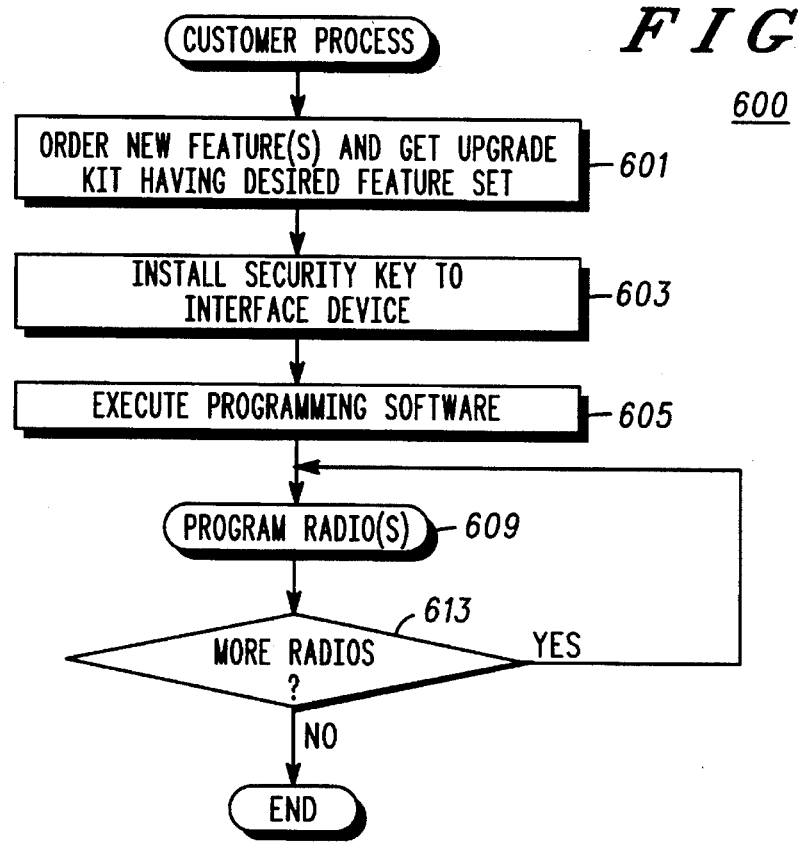
FIG. 6 shows a data flow diagram depicting the customer process, in accordance with the present invention.

FIG. 6 shows a flow diagram 600 depicting the customer upgrade process. When they desire an upgrade, the customer orders (601) the new features from the service provider, and in turn receives an upgrade kit. In a preferred embodiment, the upgrade kit includes a floppy disk containing the new operating software—i.e., desired feature set—and a security key that is programmed with the desired feature set indication and number of upgrades purchased. The security key is then installed (603) by the customer onto his interface device, and the programming software is executed (605). Once the radio has been programmed (609), the user has the option (613) of initiating another programming cycle or exiting the programming software.

Figure 7:
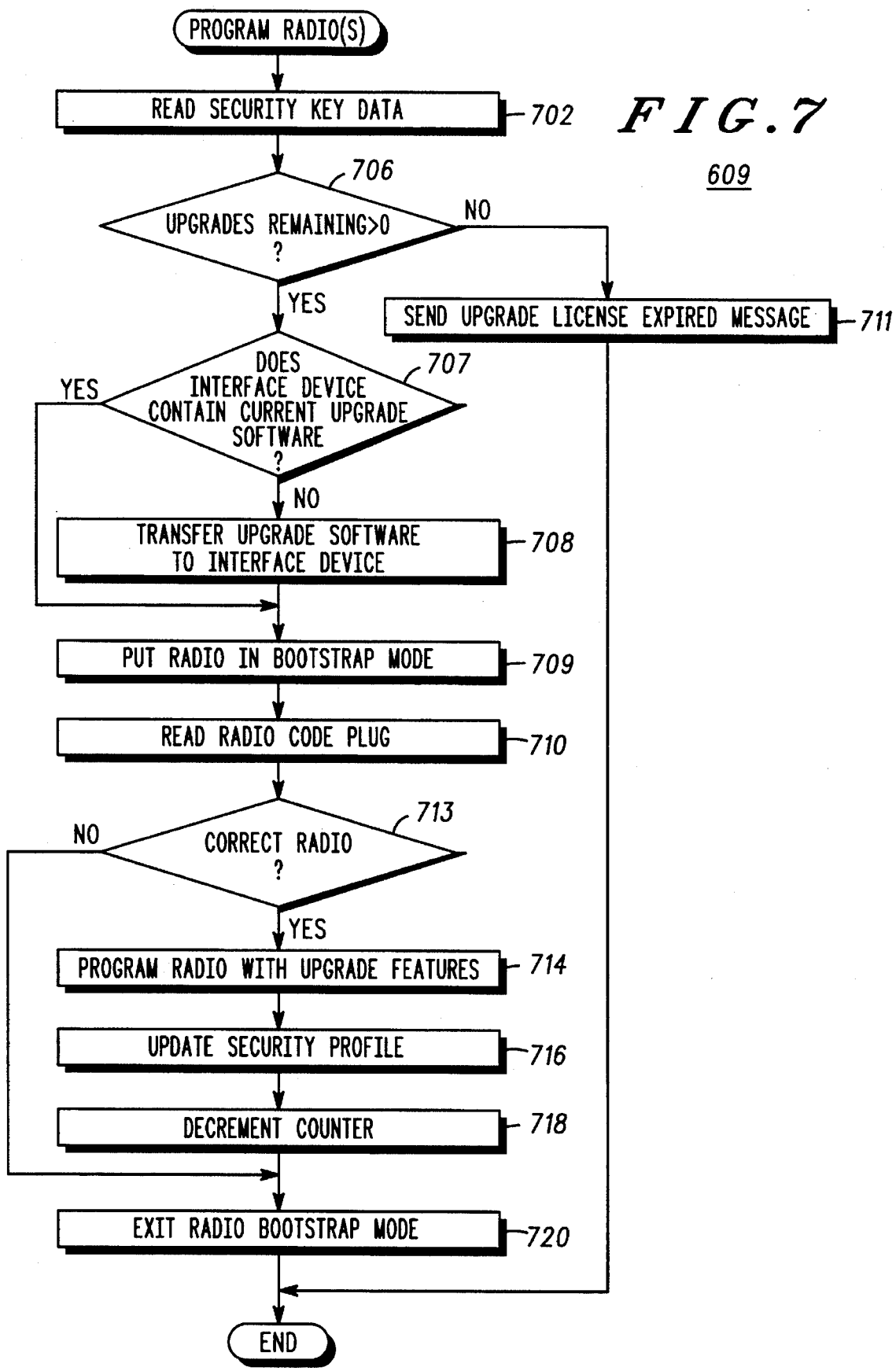
FIG. 7 shows a data flow diagram depicting the operation of the programming system, in accordance with the present invention.

FIG. 7 shows a more detailed flow diagram 609 depicting the process by which the radios are programmed. Once the program radio cycle has been initiated, the programming source reads (702) the security key data—including at least the flash code and the counter value. The number of upgrades remaining (706) is checked via the upgrade counter to determine whether or not the desired upgrade has been authorized. The upgrade counter is initially set to the number of upgrades purchased by the customer and is decremented following each upgrade. In this manner, the upgrade counter adds another level of security by limiting the number of upgrades to the number actually paid for. If no upgrades remain, the programming source sends (711) message to the customer, notifying her that the upgrade license has expired, and the routine is exited.

If upgrades remain, a decision (707) is reached to determine whether or not the interface device contains the current upgrade software. If required, the upgrade software is transferred (708) to the interface device, after which time the radio is put (709) in a special programming mode, referred to as bootstrap mode. Generally, this mode is used whenever radio control is passed from its resident system software to software externally loaded to its RAM memory. While the radio is in bootstrap mode, it will receive from the interface device the programming code that is used to program its flash memory during the upgrade process.

The radio codeplug (i.e., a resident memory device containing the so-called radio personality) is then read (710) as a check to make sure that the radio being programmed is the one for which an upgrade was purchased. If the radio is determined (713) to be incorrect—e.g., model number or current feature set indication mismatch—the bootstrap mode is exited (720), and the routine ends. If the radio is correct, the system allows this radio to be programmed (714) with the desired feature set (504). After programming, the security profile is updated (716)—i.e., the desired feature set indication, or flashcode 220, is programmed into the radio. Lastly, the counter value (222) stored in the security key is decremented (718). Then the bootstrap mode is exited (720), and the radio returns to its normal operating state. It should be noted that, in a preferred embodiment, the bootstrap exit is accompanied by an erasing of all the programming code, or instructions. This erasure adds yet another level of security against unscrupulous radio owners that may try to program radios with features that have not been paid for.

In the foregoing manner, the present invention can be advantageously employed to overcome the shortcomings of the prior art. In particular, the interface device 208 allows for a more efficient programming process. Further, security key 210 provides security and control features, that protect both the service provider and the customer alike from the deleterious effects of illicit feature programming.

What is claimed is:

1. A programming system for programmed radio, comprising:

a programming source, a first flash memory device, residing in the programmable radio, that stores at least an operable feature set;

an interface device, operably coupled to the programming source that provides access to the programmable radio by the programming source, the interface device comprising a second flash memory device that stores a desired feature set software to be used by the programmable radio; and a security key, operably coupled to the interface device, that remains at least an indication of the operable feature set.

2. The programming system of claim 1, further comprising a programming voltage source that is used to program the first flash memory device.

3. The programming system of claim 2, wherein the programming voltage source resides in the interface device.

4. The programming system of claim 1, wherein the security key comprises means for determining a maximum number of times that the operable feature set can be programmed.

5. The programming system of claim 1, wherein the security key comprises means for determining whether the desired feature set is compatible with the radio.

6. A programming system for a programmable radio, the programming system including a programming source, comprising:

first programmable memory means, residing in the programmable radio, for storing at least an operable feature set;

interface means for providing access to the programmable radio by the programming source, the interface means comprising second programmable memory means for storing operating software to be used by the programmable radio;

energy means for programming the first programmable memory means; and a security key, operably coupled to the interface means, that retains at least an indication of the operable feature set.

7. The programming system of claim 6, wherein the energy means comprises a voltage source.

8. The programming system of claim 6, further comprising a security key, operably coupled to the interface means, that retains at least an indication of the operable feature set.

9. The programming system of claims 6, wherein the security key comprises means for determining a maximum number of times that the operable feature set can be programmed.

10. The programming system of claim 6, wherein the energy means resides in the radio, and the interface means further comprises means for enabling the energy means.

11. The programming system of claim 6, wherein the first programmable memory means comprises flash memory.

12. A method of providing operational features for a programmable radio that includes a current feature set, comprising the steps of:

A) providing a security key that includes a composite indication that includes an indication of a desired feature set and an indication of the current feature set;

B) comparing the current feature set with the indication of the current feature set;

C) when the current feature set is identified by the indication of the current feature set, programming the radio with at least the desired feature set;

D) updating, responsive to step C), a counter value in the security key; and

E) when the counter value reaches a predetermined number, disabling the security key.

* * * * *